(12) United States Patent
Hsieh et al.

(10) Patent No.: US 10,402,475 B2
(45) Date of Patent: *Sep. 3, 2019

(54) TEXT MESSAGE DISPLAYING METHOD AND SYSTEM, AND TEXT MESSAGE PROVIDING SYSTEM

(71) Applicant: PEGATRON CORPORATION, Taipei (TW)

(72) Inventors: Kuang-Hsun Hsieh, Taipei (TW); Yu-Yang Chao, Taipei (TW); Yu-Han Kao, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,912

(22) Filed: Nov. 26, 2018

(65) Prior Publication Data

US 2019/0095405 A1    Mar. 28, 2019

Related U.S. Application Data

(63) Continuation of application No. 14/727,170, filed on Jun. 1, 2015, now Pat. No. 10,176,151.

(30) Foreign Application Priority Data

Jun. 5, 2014   (TW) .............................. 103119477 A

(51) Int. Cl.
*G06F 17/22*    (2006.01)
*H04L 12/58*    (2006.01)
(Continued)

(52) U.S. Cl.
CPC ...... *G06F 17/2223* (2013.01); *G06F 16/3337* (2019.01); *G06F 16/9574* (2019.01);
(Continued)

(58) Field of Classification Search
None
See application file for complete search history.

(56) References Cited

U.S. PATENT DOCUMENTS 4,051,457 A    9/1977   Inose et al.
4,541,069 A    9/1985   Kanou et al.
(Continued)

FOREIGN PATENT DOCUMENTS

CN    10207857 A     6/2008
CN    101419588 A    4/2009
(Continued)

*Primary Examiner* — Ramy M Osman
(74) *Attorney, Agent, or Firm* — Muncy, Geissler, Olds & Lowe, P.C.

(57) ABSTRACT

A text information displaying method for displaying a message received or generated by a first electronic device on a display of a second electronic device. The text information displaying method includes the steps of: receiving a request of displaying the message; generating a word string according to the request, wherein the word string includes at least one word pattern and at least one character code correspondingly representing the at least one word pattern; transmitting the word pattern and the character code from the first electronic device to the second electronic device; and receiving the at least one word pattern and the at least one character code, and displaying the at least one word pattern corresponding to the message received or generated by the first electronic device on the display according to the character code.

11 Claims, 2 Drawing Sheets

(51) Int. Cl.
  *G06F 16/957* (2019.01)
  *G06F 16/33* (2019.01)
  *G06F 1/00* (2006.01)

(52) U.S. Cl.
  CPC .......... *G06F 17/2217* (2013.01); *H04L 51/06* (2013.01); *H04L 51/066* (2013.01); *G06F 1/00* (2013.01)

(56) References Cited

U.S. PATENT DOCUMENTS

| | | | |
|---|---|---|---|
| 4,679,951 A * | 7/1987 | King | B41J 3/01 345/168 |
| 4,723,217 A | 2/1988 | Nakano et al. | |
| 4,811,242 A * | 3/1989 | Adachi | G06F 17/214 358/1.11 |
| 5,680,520 A | 10/1997 | Watanabe et al. | |
| 5,680,612 A | 10/1997 | Asada et al. | |
| 5,721,939 A | 2/1998 | Kaplan | |
| 5,786,776 A | 7/1998 | Kisaichi et al. | |
| 5,801,664 A * | 9/1998 | Seidensticker | G06F 3/14 345/10 |
| 5,943,443 A * | 8/1999 | Itonori | G06K 9/72 358/403 |
| 6,167,287 A * | 12/2000 | Chozui | H04M 1/247 345/171 |
| 6,201,552 B1 | 3/2001 | Itou et al. | |
| 6,701,008 B1 | 3/2004 | Suino | |
| 8,862,166 B2 * | 10/2014 | Kennard | H04W 4/14 348/189 |
| 10,176,151 B2 * | 1/2019 | Hsieh | G06F 16/9574 |
| 2001/0012992 A1 * | 8/2001 | Kimpara | G06F 17/289 704/5 |
| 2001/0019329 A1 * | 9/2001 | Kobayashi | G06F 17/214 345/467 |
| 2003/0030641 A1 | 2/2003 | Rauch | |
| 2004/0068585 A1 * | 4/2004 | Lee | H04L 12/1859 709/246 |
| 2004/0268256 A1 * | 12/2004 | Furuta | G06F 17/2223 715/262 |
| 2007/0172125 A1 * | 7/2007 | Walch | G06K 9/00402 382/186 |
| 2012/0253786 A1 | 10/2012 | Al-Omari et al. | |
| 2014/0124572 A1 * | 5/2014 | Khorsheed | G06F 16/9554 235/375 |
| 2014/0171156 A1 * | 6/2014 | Pattikonda | H04M 1/6041 455/569.1 |
| 2014/0297254 A1 * | 10/2014 | Yeo | G06F 17/289 704/2 |
| 2015/0011199 A1 * | 1/2015 | Lee | H04M 1/7253 455/418 |
| 2015/0358264 A1 * | 12/2015 | Hsieh | G06F 16/9574 709/206 |

FOREIGN PATENT DOCUMENTS

| | | |
|---|---|---|
| TW | 545819 | 8/2003 |
| TW | 201344457 A | 11/2013 |

\* cited by examiner

TEXT MESSAGE DISPLAYING METHOD AND SYSTEM, AND TEXT MESSAGE PROVIDING SYSTEM

CROSS-REFERENCE TO RELATED APPLICATIONS

This application is a Continuation of co-pending application Ser. No. 14/727,170, filed on Jun. 1, 2015, for which priority is claimed under 35 U.S.C. § 120; and this Non-provisional application claims priority under 35 U.S.C. § 119(a) on Patent Application No. 103119477 filed in Taiwan, Republic of China on Jun. 5, 2014, the entire contents of all of which are hereby incorporated by reference

BACKGROUND

Field of Invention

The invention relates to a text message displaying method and system and, in particular, to a text message displaying method and system that a word pattern of the content of a text message is provided from a handheld electronic device with more hardware resources to a wearable device to display.

Related Art

Conventionally, to display Chinese or Asian words on a graphical user interface of a device having a display, a Chinese or a Asian word library must be built in that device in advance. When displaying a word, the Chinese or Asian word to be shown is retrieved from the word library according to a character code. However, the size of the library is limited by the memory space of the electronic device. Take the traditional Chinese as an example, the standard font table of commonly-used Chinese words and standard font table of uncommonly-used Chinese words include eleven thousands of Chinese words. A huge memory space is required to store them in the word library of the electronic device. Therefore, for an electronic device having limited memory space, such as a smart watch, how to display words completely becomes a difficult challenge during the product development process.

SUMMARY

An objective of the invention is to provide a text message displaying method that separates the generation and the display of a word pattern.

Another objective of the invention is to provide a text message displaying system and the text message providing system for executing the method mentioned above.

The text message displaying method of an embodiment of the invention is for displaying a text message received or generated by a first electronic device on a display of a second electronic device. The text message displaying method includes the steps of: receiving a request of displaying the text message, wherein the request is generated according to the text message received or generated by the first electronic device; generating a word string according to the request, wherein the word string includes at least one word pattern and at least one character code correspondingly representing the at least one word pattern; transmitting the word pattern and the character code from the first electronic device to the second electronic device; and receiving the word pattern and the character code, and displaying the word pattern corresponding to the text message received or generated by the first electronic device on the display according to the character code.

The text message displaying system of an embodiment of the invention is for displaying a text message received or generated by a first electronic device on a display of a second electronic device. The text message displaying system includes a request receiving module, a string generating module, a string transmission module and a string displaying module. The request receiving module receives a request of displaying the text message, wherein the request is generated according to the text message received or generated by the first electronic device. The string generating module generates a word string according to the request, wherein the word string includes at least one word pattern and at least one character code correspondingly representing the at least one word pattern. The string transmission control module transmits the word pattern and the character code from the first electronic device to the second electronic device. The string displaying module receives the word pattern and the character code, and displaying the word pattern corresponding to the text message received or generated by the first electronic device on the display according to the character code.

The text message providing system of the invention is for a first electronic device, wherein the first electronic device is capable of performing a signal communication with a second electronic device. The text message providing system includes a request receiving module, a string generating module and a string transmission module. The request receiving module receives a request of displaying the text message, wherein the request is generated according to the text message received or generated by the first electronic device. The string generating module generates a word string according to the request, wherein the word string includes at least one word pattern and at least one character code correspondingly representing the at least one word pattern. The string transmission control module transmits the word pattern and the character code from the first electronic device to the second electronic device.

The text message displaying method and system separates the generation and the display of the content of the text message, so that the electronic device having smaller memory space, such as a smart watch, is responsible for the display of the text message only, while the generation of the content of the text message, that is, the generation of the word pattern and the corresponding character code, is handled by the electronic device having larger memory space. With such technique, the issue of the incompleteness of the word library of the electronic device having smaller memory space can be solved

DETAILED DESCRIPTION OF THE EMBODIMENT

The present invention will be apparent from the following detailed description, which proceeds with reference to the accompanying drawings, wherein the same references relate to the same elements.

Figure 1:
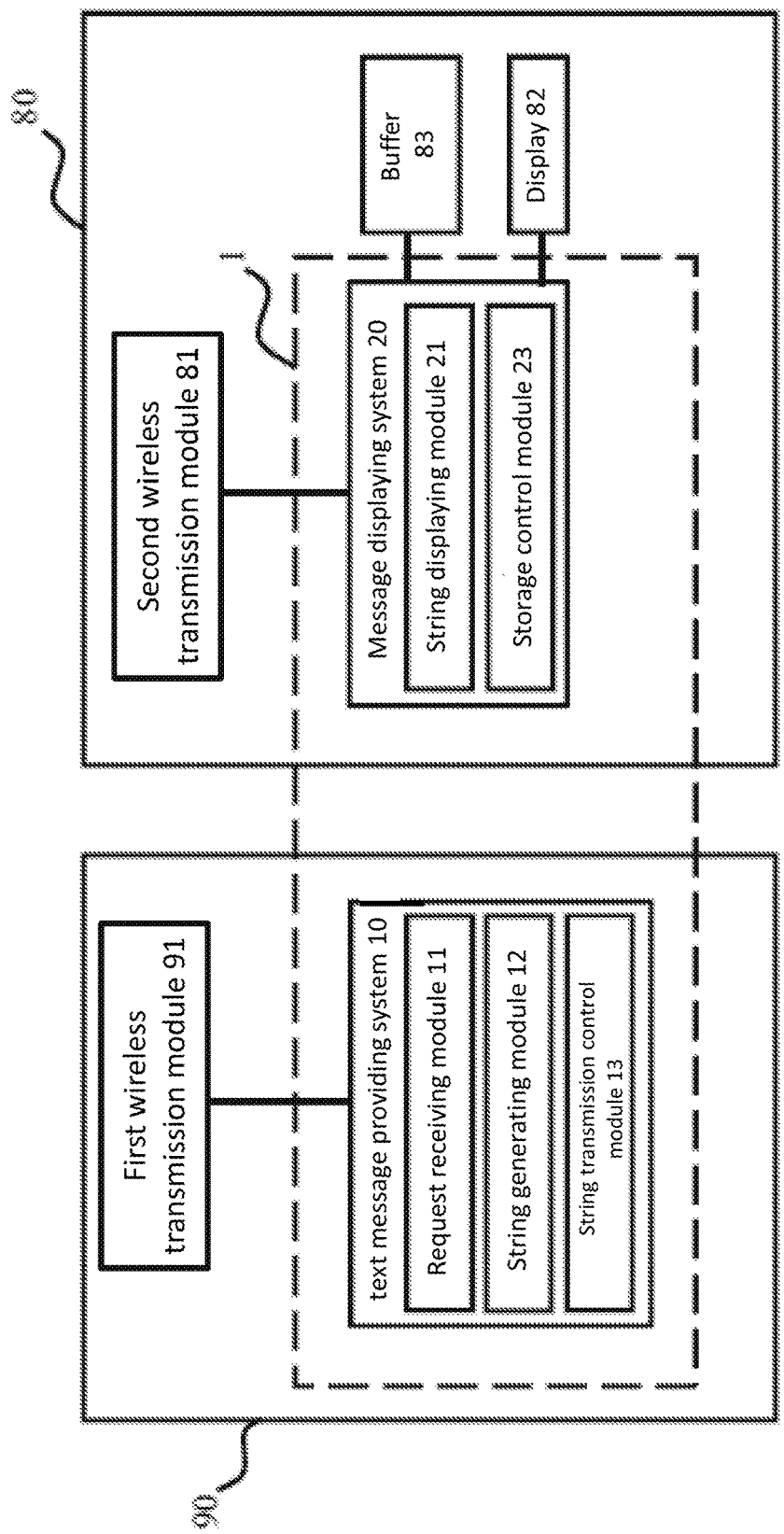
FIG. 1 is a system architecture diagram of the text message displaying system and the text message providing system according to an embodiment of the invention.

First, please refer to FIG. 1, which is a system diagram of the text message displaying system according to an embodiment of the invention.

As shown in FIG. 1, the text message displaying system 1 of the embodiment includes a message providing system 10 and a message displaying system 20. The message providing system 10 is disposed in a first electronic device 90 having a first wireless transmission module 91, and the message displaying system 20 is disposed in a second electronic device 80 having a second wireless transmission module 81, a display 82 and a buffer 83. The second electronic device 80 has less storage resource than the first electronic device 90. In other words, the internal memory space of the second electronic device 90 is smaller than the first electronic device 90, and therefore the second electronic device 90 cannot store too many word patterns. The first electronic device 90 and the second electronic device 80 can transmit data with each other via the communication link between the first wireless transmission module 91 and the second wireless transmission module 81. In the embodiment of the invention, the first electronic device 90 is a smartphone, the second electronic device 80 is a smart watch, and the first wireless transmission module 91 and the second wireless transmission module 81 may be Bluetooth transmission devices. However, the invention is not limited therein.

The text message providing system 10 according to the embodiment of the invention includes a request receiving module 11, a string generating module 12 and a string transmission control module 13. The message displaying system 20 includes a string displaying module 21 and a storage control module 23. In the embodiment of the invention, the modules mentioned above are implemented by software programs. However, the invention is not so limited. Each module may be a hardware device, firmware, a circuit or any suitable configuration.

In one embodiment of the invention, the request receiving module 11 receives a request of displaying a text message generated at the first electronic device 90. The request of displaying the text message is generated according to the text message received or generated by the first electronic device 90. For example, the user can set in advance to generate the request of displaying a real-time message immediately when the first electronic device 90 receives the real-time message from another electronic device. After that, once the first electronic device receives a real-time message from another electronic device, the request receiving module 11 receives a request of displaying a text message (a request of displaying a real-time message). The user can also set to generate a request of displaying a prompt about the exhaustion of the battery power when only 20% power remains in the battery. With such setting, once the battery power of the first electronic device 90 has only 20% left, the request receiving module 11 receives the request of displaying the text message (the request of displaying the exhaustion of battery power). Note that except for the request of displaying a real-time message about the exhaustion of the battery power, the user can also set to receive a request of displaying a text message under other situations.

The string generating module 12 generates a word string according to the request received at the request receiving module 11, wherein the word string has at least one word pattern and at least one Chinese character code corresponding to the word pattern. Take the request of displaying the real-time message mentioned above as an example, assuming that the content of the text message is "哈 (ha) 囉 (luo)", the string generating module 12 generates a word string according to this request after receiving the request of displaying a real-time message, wherein the text message includes at least one word pattern. In this embodiment, the word string includes two word patterns of "哈 (ha)" and "囉 (luo)" and the two Chinese character codes individually representing these word patterns. Since the generation of the word patterns and the corresponding relationships between the word patterns and the Chinese character codes are existing data structure processing techniques, the details are omitted here for concise purpose.

The string transmission control module 13 transmits the word patterns and the Chinese character codes generated by the string generating module 12 from the first electronic device 90 to the second electronic device 80. Take the above embodiment as an example, after the string generating module 12 generates the two word patterns of "哈 (ha)" and "囉 (luo)" and the two Chinese character codes representing these word patterns, the string transmission control module 13 transmits the word patterns of "哈 (ha)" and "囉 (luo)" and the Chinese character codes 囉 representing these word patterns respectively from the first electronic device 90 to the second electronic device 80 via the connection between the first wireless transmission control module 91 and the second wireless transmission module 81.

In one embodiment of the invention, when the generated word pattern and the Chinese character codes are in plural, the string transmission control module 13 judges whether repetitive word patterns exist before transmitting the word patterns and the Chinese character codes. If yes, when transmitting the word patterns and the Chinese character codes, the string transmission control module 13 transmits all Chinese character codes and non-repetitive word patterns from the first electronic device 90 to the second electronic device 80. If no, when transmitting the word patterns and the Chinese character codes, the string transmission control module 13 transmits all word patterns and Chinese character codes from the first electronic device 90 to the second electronic device 80. That is, no matter whether repetitive word patterns exist, the Chinese character codes with the same sequence to the texts in the word string are transmitted from the first electronic device 90 to the second electronic device 80. For example, assuming that the generated word string includes four word patterns of "天 (tian)", "天 (tian)", "想 (xiang)" and "你 (you)" and four Chinese character codes representing these four word patterns, the string transmission control module 13 judges that two repetitive word patterns "天 (tian)" and "天 (tian)" exist in the word patterns before transmitting them. When transmitting the word patterns and Chinese character codes, the string transmission control module 13 transmits only three word patterns of "天 (tian)", "想 (xiang)" and "你 (ni)" and four Chinese character codes with the same sequence to the texts. To the contrary, if the generated word string includes two word patterns of "哈 (ha)" and "囉 (luo)" and two Chinese character codes representing these two word patterns respectively, the string transmission control module 13 transmits all word patterns and Chinese character codes to the second electronic device 80 when transmitting word patterns and Chinese character codes.

The string displaying module 21 receives the word patterns and the Chinese character codes transmitted from the string transmission control module 13, and displaying the message received or generated by the first electronic device 90 on the display 82 according to the Chinese character codes. For example, when the string displaying module 21 receives two word patterns of "哈 (ha)" and "囉 (luo)" and the Chinese character codes representing these two word patterns, the string displaying module 21 displays the two word patterns of "哈 (ha)" and "囉 (luo)" on the display 82 according to the Chinese character codes received. "哈 (ha) 囉 (luo)" is the content of the real-time message originally received by the first electronic device. In another example, when the string displaying module 21 receives three word patterns of "天 (tian)", "想 (xiang)", and "你 (ni)", two Chinese character codes representing "天 (tian)", and two Chinese character codes representing "想 (xiang)" and "你 (ni)" respectively, since the string displaying module 21 receives two Chinese character codes representing "天 (tian) ", it still displays two "天 (tian)" on the display 82 according to the Chinese character codes. That is, the message displayed on the display 82 of the second electronic device 80 is the same to the real-time message originally received by the first electronic device, which is "天天想你 (tian tian xiang ni)". Similarly, the message generated when the first electronic device 90 is run out of power, such as "電量僅剩 20% power remains)", can be displayed on the display 82 of the second electronic device 80 by executing the mechanism described above. Therefore, the user can be notified in time by the second electronic device 80 that the battery power of the first electronic device 90 is going to be exhausted.

In one embodiment of the invention, the storage control module 23 judges whether the word pattern received by the string displaying module 21 is the same to the stored word pattern stored in the second electronic device 80. When it is judged that the word pattern is the same to the stored word pattern, the word pattern being the same to the stored word pattern is not stored in the buffer 83. When the word pattern is not the same to the stored word pattern, the word pattern being not the same to the stored word pattern is stored in the buffer 83. Take the above embodiment as an example, assuming that the string displaying module 21 receives three word patterns of "天 (tian)", "想 (xiang)", and "你 (ni)" and four Chinese character codes representing four word patterns of "天 (tian)", "天 (tian)", "想 (xiang)", and "你 (ni)", respectively, if the word pattern of "你 (ni)" is already stored in the buffer 83 of the second electronic device 80 (which is a stored word pattern), the storage control module 23 only stores the word patterns of "天 (tian)" and "想 (xiang)" and the Chinese character codes representing the four word patterns of "天 (tian)", "天 (tian)", "想 (xiang)", and "你 (ni)" in the buffer 83 without storing the word pattern of "你 (ni)" in the buffer 83.

Figure 2:
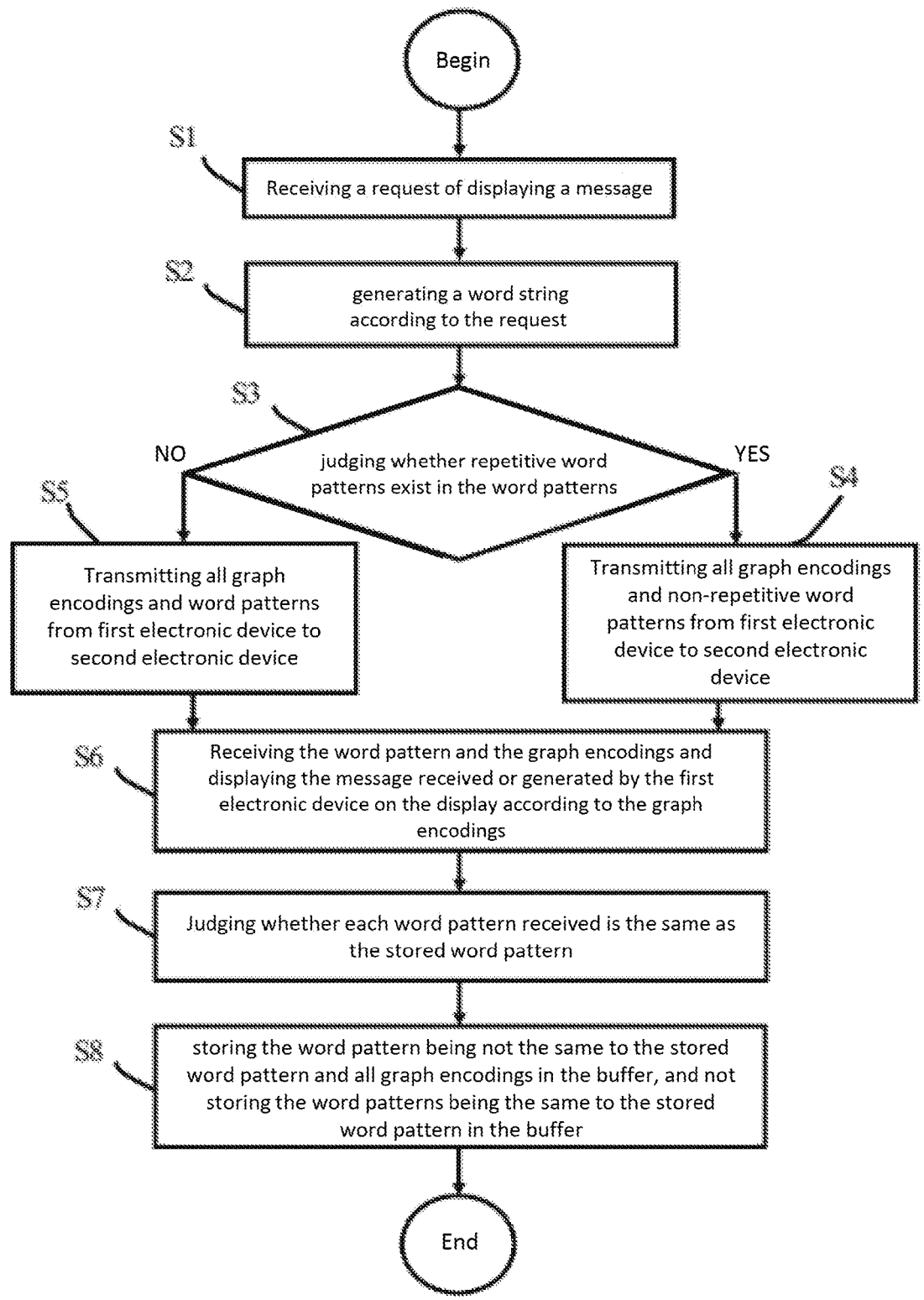
FIG. 2 is a flowchart of the text message displaying method according to an embodiment of the invention.

Afterward please refer to FIG. 1 and FIG. 2 simultaneously, wherein FIG. 2 is a flowchart of the text message displaying method according to an embodiment of the invention.

First, step S1 is executed: receiving a request of displaying a message.

As shown in FIG. 1, when the first electronic device 90 generates a request of displaying a message when the message is received or generated, such as a request of displaying a real-time message when the real-time message is received from another electronic device or a request of displaying a prompt message when a prompt message is generated by the first electronic device, the request receiving module 11 receives this request of displaying the message.

Then step S2 is executed: generating a word string according to the request.

After the request receiving module 1 receives the request of displaying the message, the string generating module 12 can generate a word string according to the request received by the request receiving module 11. The contents of the word string vary depending on the contents of the request. The word string generated may include a word pattern and the Chinese character code correspondingly representing the word pattern. For example, when the real-time message received by the first electronic device 90 is composed of one single word such as "愛 (ai)", the word string generated would include the word pattern of the word "愛 (ai)" and the Chinese character codes representing the word "愛 (ai)". When the real-time message is composed of multiple words such as F"天天想你 (tian tian xiang ni)", then the word string generated would include four word patterns of "天 (tian)", "天 (tian)", "想 (xing)" and "你 (ni)", and four Chinese character codes representing the four word patterns. In other words, the content and numbers of the word pattern and the correspondingly representing Chinese character codes depend on the content of the message corresponding to the request.

Step S3 is executed: judging whether repetitive word patterns exist in the word patterns.

After the word string is generated and before the word pattern and the Chinese character code is transmitted from the first electronic device 90 to the second electronic device 80 (that is, before executing steps S4 and S5), the string transmission control module 13 judges whether repetitive word patterns exist in the word patterns. If yes, when transmitting word patterns and Chinese character codes, the string transmission control module 13 transmits only the non-repetitive word patterns to the second electronic device 80, while all Chinese character codes are still transmitted to the second electronic device 80 (that is, executing step S4). If no, the string transmission control module 13 transmits all word patterns and Chinese character codes to the second electronic device 80 (that is executing step S5). For example, assuming that the word string generated includes four word patterns of "天 (tian)", "天 (tian)", "想 (xiang)" and "你 (ni)" and four Chinese character codes correspondingly representing these four word patterns, when transmitting the word patterns and Chinese character codes from the first electronic device 90 to the second electronic device 80, the string transmission control module 13 transmits only three word patterns of "天 (tian)", "想 (xiang)" and "你 (ni)" and all four Chinese character codes. Another example is that when the generated string massage includes two word patterns of "哈 (ha)" and "囉 (luo)" and the Chinese character codes correspondingly representing these two word patterns, since no repetitive word patterns exist, the string transmission control module 13 transmits all the two word patterns of "哈 (ha)" and "囉 (luo)" and the two Chinese character codes correspondingly representing these two word patterns.

Step S6 is executed: receiving the word pattern and the Chinese character codes and displaying the message received or generated by the first electronic device on the display according to the Chinese character codes.

After step S4 or S5, the string displaying module 21 receives the word patterns and Chinese character codes transmitted, and display the message received or generated by the first electronic device 90 on the display according to the Chinese character codes. For example, assuming that the real-time message received by the first electronic device 90 is "天天想你 (tian tian xiang ni)", the string transmission control module 13 transmits three word patterns of "天 (tian)", "想 (xiang)" and "你 (ni)", two Chinese character codes representing "天 (tian)", and two Chinese character codes representing "想 (xiang)" and "你 (ni)" respectively via the steps described above. Once the string displaying module 21 receives these word patterns and Chinese character codes, the string displaying module 21 displays four word patterns of "天 (tian)", "天 (tian)" (because the number of Chinese character codes representing the word pattern of "天" is two), "想 (xiang)" and "你 (ni)" on the display 82 according to the Chinese character codes. Therefore, the four words of "天天想你 (tian tian xiang ni)" are displayed on the display 82.

Step 7 is executed: judging whether each word pattern received is the same as the stored word pattern.

In the embodiment of the invention, when the string displaying module 21 receives the word patterns and Chinese character codes transmitted from the string transmission control module 13, the storage control module 23 judges whether each word pattern received by the string displaying module 21 is the same as the stored word pattern already stored in the second electronic device 80 to determine whether to store the received word pattern in the buffer 83 according to whether the received word pattern and the stored word pattern are repetitive.

Step 8 is executed: storing the word pattern being not the same to the stored word pattern and all Chinese character codes in the buffer, and not storing the word patterns being the same to the stored word pattern in the buffer.

After executing step S7, the storage control module 23 stores the received word patterns not repetitive to the stored word pattern and all Chinese character codes in the buffer 83, and does not store the received word patterns repetitive to the stored word pattern in the buffer 83. For example, assuming that the string displaying module 21 transmits three word patterns of "天 (tian)", "想 (xiang)" and "你 (ni)", two Chinese character codes representing the word pattern of "天 (tian)", and two Chinese character codes representing the word patterns of "想 (xiang)" and "你 (ni)" respectively, since the word pattern of "你 (ni)" is already stored in the buffer 83 of the second electronic device 80 (that is, a stored word pattern), the storage control module 23 stores only the word patterns of "天 (tian)" and "想 (xiang)" and all Chinese character codes in the buffer 83 without storing the word pattern of "你 (ni)" in the buffer 83.

From the above, the text message displaying method separates the generation and the display of the content of the message, so that the electronic device having smaller memory space is responsible for the display of the message only, while the generation of the content of the message, that is, the generation of the word patterns and the corresponding Chinese character codes, is handled by the electronic device having larger memory space. With such technique, the issue of the incompleteness of the word library of the electronic device having smaller memory space can be solved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A text message displaying method for displaying a text message received or generated by a first electronic device on a display of a second electronic device, the text message displaying method comprising the steps of:
   receiving a request of displaying the text message, wherein the request is generated according to the text message received or generated by the first electronic device, and the text message includes at least one word pattern;
   generating a word string and the word string including the at least one word pattern and at least one character code correspondingly representing the at least one word pattern according to the request;
   transmitting the at least one word pattern and the at least one character code from the first electronic device to the second electronic device;
   receiving the at least one word pattern and the at least one character code, and displaying the at least one word pattern corresponding to the text message received or generated by the first electronic device on the display according to the at least one character code;
   judging whether the at least one word pattern is the same to a stored word pattern in a buffer of the second electronic device; and
   if yes, storing the at least one character code but not storing the at least one word pattern in the buffer.

2. The text message displaying method according to claim 1, wherein the at least one word pattern is not the same to a stored word pattern in a buffer of the second electronic device, further comprising the step of:
   storing the at least one word pattern and the at least one character code in the buffer.

3. The text message displaying method according to claim 1, wherein the numbers of the at least one word pattern and the at least one character code are in plural, and before transmitting the word patterns and the character codes, the text information displaying method further comprises the steps of:
   judging whether repetitive word patterns exist in the plurality of word patterns;
   if no, transmitting all of the plurality of word patterns and the plurality of character codes from the first electronic device to the second electronic device; and
   if yes, transmitting all of the plurality of character codes and at least one non-repetitive word pattern from the first electronic device to the second electronic device.

4. The text message displaying method according to claim 1, wherein the first electronic device is a handheld electronic device and the second electronic device is a wearable device.

5. A text message displaying system for displaying a text message received or generated by a first electronic device on a display of a second electronic device, the text information displaying system comprising:
   a request receiving module receiving a request of displaying the text message, wherein the request is generated according to the text message received or generated by the first electronic device, and the text message includes at least one word pattern;
   a string generating module generating a word string and the word string including the at least one word pattern and at least one character code correspondingly representing the at least one word pattern according to the request;
   a string transmission control module transmitting the at least one word pattern and the at least one character code from the first electronic device to the second electronic device;
   a string displaying module receiving the at least one word pattern and the at least one character code and displaying the at least one word pattern corresponding to the text message received or generated by the first electronic device on the display according to the at least one character code;
   a storage control module judging whether the at least one word pattern is the same to a stored word pattern in a buffer of the second electronic device; and if yes, the storage control module storing the at least one character code but not storing the at least one word pattern in the buffer.

6. The text message displaying system according to claim 5, wherein if the at least one word pattern is not the same to a stored word pattern in a buffer of the second electronic device, the storage control module storing the at least one word pattern and the at least one character code in the buffer.

7. The text message displaying system according to claim 5, wherein the numbers of the at least one word pattern and the at least one character code are in plural; the string transmission control module further judges whether repetitive word patterns exist in the plurality of word patterns, and if yes, transmitting all of the plurality of character codes and at least one non-repetitive word pattern from the first electronic device to the second electronic device.

8. The text message displaying system according to claim 5, wherein the first electronic device is a handheld electronic device and the second electronic device is a wearable device.

9. A text message providing system for a first electronic device, the first electronic device being capable of performing a signal communication with a second electronic device, the text message providing system comprising:
a request receiving module receiving a request of displaying a text message, wherein the request is generated according to the text message received or generated by the first electronic device, and the text message includes at least one word pattern;
a string generating module generating a word string and the word string including the at least one word pattern and at least one character code correspondingly representing the at least one word pattern according to the request; and
a string transmission control module transmitting the at least one word pattern and the at least one character code from the first electronic device to the second electronic device;
wherein the string transmission control module judges whether the at least one word pattern is the same to a stored word pattern in a buffer of the second electronic device, if yes, the at least one character code stores but the at least one word pattern not stores in the buffer.

10. The text message providing system according to claim 9, wherein if the at least one word pattern is not the same to a stored word pattern in a buffer of the second electronic device, the storage control module storing the at least one word pattern and the at least one character code in the buffer.

11. The text message providing system according to claim 9, wherein the numbers of the at least one word pattern and the at least one character code are in plural; the string transmission control module further judges whether repetitive word patterns exist in the plurality of word patterns, and if yes, transmitting all of the plurality of character codes and at least one non-repetitive word pattern from the first electronic device to the second electronic device.

* * * * *